S. B. HOLMES.
AUTOMOBILE TIRE.
APPLICATION FILED MAR. 30, 1920.
1,363,976.
Patented Dec. 28, 1920.
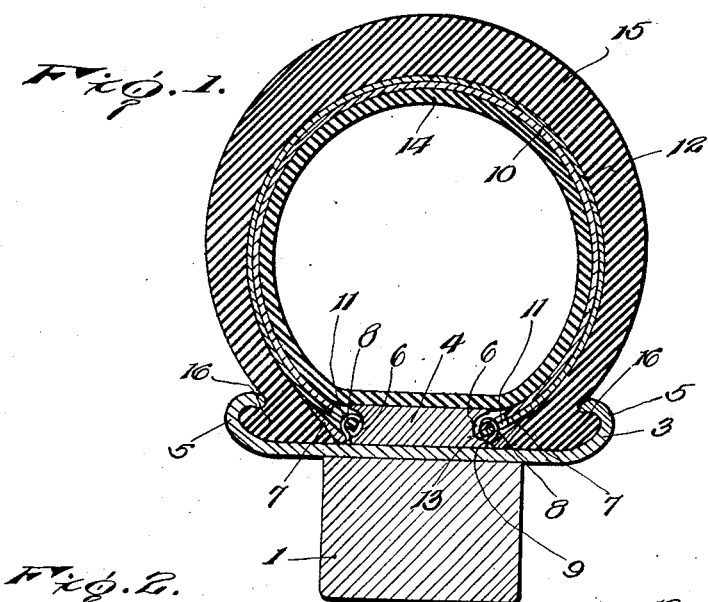
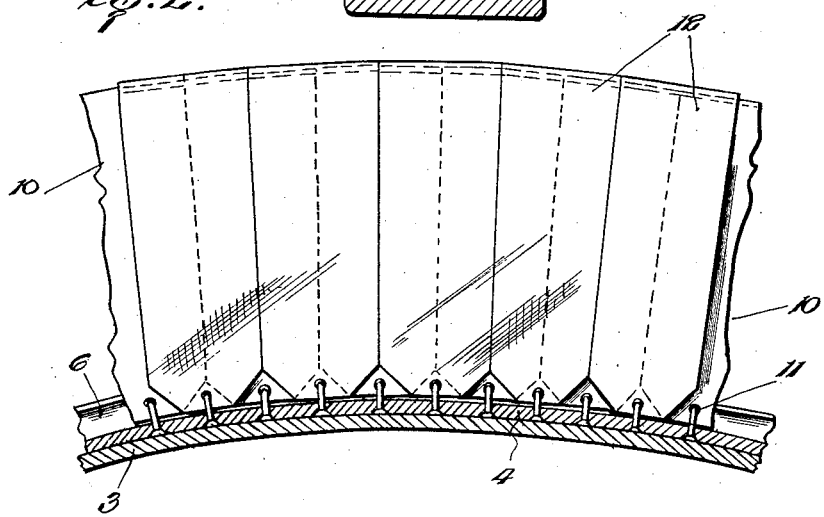
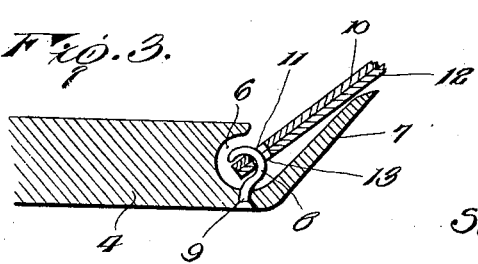
Inventor
Stanley B. Holmes
By Fred P. Torin
Attorney

UNITED STATES PATENT OFFICE.

STANLEY B. HOLMES, OF SEATTLE, WASHINGTON.

AUTOMOBILE-TIRE.

1,363,976. Specification of Letters Patent. Patented Dec. 28, 1920.

Application filed March 30, 1920. Serial No. 369,904.

*To all whom it may concern:*

Be it known that STANLEY B. HOLMES, a citizen of the United States, and residing at Seattle, in the county of King and State of Washington, has invented certain new and useful Improvements in Automobile-Tires, of which the following is a specification.

This invention relates to new improvements in automobile tires.

An object of the invention is to provide a tubular member within the casing for protecting the inner tube against punctures and to increase the wearing qualities of the tire.

The invention also comprehends improvements in the details of construction which are particularly pointed out in the following description and claim:

In the drawings:—

Figure 1 is a transverse section through a tire and rim showing the invention applied thereto.

Fig. 2 is a side elevation of a portion of the tire with the outer casing removed.

Fig. 3 is an enlarged detail section showing the manner of securing the plates to the supplemental rim.

1 indicates the felly of a wheel, having the usual demountable rim 3 thereon, which is of clencher construction.

A supplemental rim 4 is mounted on rim 3 between the clenchers 5, the edges of said rim having annular recesses 6, and also having the inner edges extending beyond the outer edges as indicated at 7, to form a protecting flange for the casing 15. A plurality of hooks 8 are mounted in the recess 6, and have their stems 9 extending through the portion 7 of the rim 4, and secured thereto as shown.

A series of flexible metallic strips 10, having openings 11 in the end portions, are adjacently mounted around the rim, and have alternate hooks extending through the openings 11 to secure the strips to the rim.

Another series of flexible metallic strips 12 are adjacently mounted over the strips 10 and have openings 13 in the end portions through which intermediate hooks 8 extend. The inner tube 14 is confined within strips 11, and the outer casing 15 is placed over the strips 12, and has the beads 16 secured in the clencher portions 5 of the rim 3 in the usual manner.

In applying a tire using this invention, the first operation in assembling is to place supplemental rim 4 on rim 3. The metallic strips 10 and 12 then have the ends around one side, secured to the hooks 8 in rim 4. An inner tube, partially inflated is placed on the rim and the metallic strips are drawn down over the tube, and have the free ends secured over the hooks 8. This confines and protects the tube as will be obvious. The outer casing is then applied in the usual manner and the tire inflated to proper pressure.

It will be noted that the tire with this device applied is substantially puncture proof, and at the same time will wear considerably longer than the average tire.

The portions 7 of the rim 4 are provided to protect the outer casing from injury by the ends of said strips 10 and 12.

It will be apparent that a simple and inexpensive armor, for an inner tube has been provided, in the use of a supplemental rim having a plurality of hooks mounted therein, for securing the ends of two layers of adjacently mounted metallic strips which protect the tube from puncture and increase the wearing qualities of the tire.

What I claim is:

An armored tire having in combination, a rim, a casing, adapted for mounting thereon, a supplemental rim adapted for mounting on the rim between the inner edges of said casing and having annular recesses in the edges thereof, a plurality of hooks mounted in the rim and extending in the recesses, a plurality of strips adapted to have their ends secured to relative hooks in each recess, and an inner tube adapted to fit within the space inclosed by said strips.

In testimony whereof I affix my signature.

STANLEY B. HOLMES.